United States Patent

Gibson

[15] 3,649,749

[45] Mar. 14, 1972

[54] APPARATUS PERMITTING RELIABLE SELECTION OF TRANSMITTED TELEVISION MESSAGE INFORMATION

[72] Inventor: J. James Gibson, Princeton, N.J.

[73] Assignee: RCA Corporation, New York, N.Y.

[22] Filed: Oct. 21, 1970

[21] Appl. No.: 82,593

[52] U.S. Cl. .......................................178/5.6, 178/DIG. 23

[51] Int. Cl. ..........................................................H04n 7/00

[58] Field of Search.............................178/5.6, 5.8, DIG. 23

[56] References Cited

UNITED STATES PATENTS

| | | | |
|---|---|---|---|
| 3,491,199 | 1/1970 | Weinstein et al. | 178/5.6 |
| 3,493,674 | 2/1970 | Houghton | 178/DIG. 23 |
| 3,507,985 | 4/1970 | Breakink et al. | 178/5.6 |
| 3,551,591 | 12/1970 | Nakamura et al. | 178/5.6 |

*Primary Examiner*—Robert L. Richardson
*Attorney*—Eugene M. Whitacre

[57] ABSTRACT

A digital countdown circuit is synchronized by a "flag" signal transmitted every other television field to permit reliable selection of a predetermined television frame line in a system transmitting auxiliary television message information. The "-flag" signal can be unreliable in the sense that the countdown circuit can miss the "flag" in a large percentage of cases, but is reliable in the sense that the probability of mistaking other signals as the desired "flag" is small, even in the presence of noise which impairs the quality of the received television picture.

4 Claims, 4 Drawing Figures

INVENTOR.
J. James Gibson

BY

Charles Bruckley
Attorney

INVENTOR.
J. James Gibson
BY
Charles Brodsky
Attorney

INVENTOR.
J. James Gibson
BY Charles Brodsky
Attorney

APPARATUS PERMITTING RELIABLE SELECTION OF TRANSMITTED TELEVISION MESSAGE INFORMATION

BACKGROUND OF THE INVENTION

1. Field of the Invention

This invention relates to the transmission of special message information to the public using existing television facilities, without interfering with regular television program service. More particularly, it relates to the transmission of a relatively weak and unreliable "flag" signal to enable reliable recovery at the receiver of selected messages for reproduction.

2. Description of the Prior Art

A system which accomplishes such transmission of special messages is disclosed in U.S. Pat. No. 3,493,674. One embodiment of the system therein described sequentially multiplexes message representative line-scan video signals developed by an auxiliary pickup camera with primary program video signals developed by a studio pickup camera during predetermined portions of the vertical blanking interval thereof, at a rate of one line-scan signal per message per field of program information. More specifically, those video message signals are inserted during a time interval corresponding to that between successive horizontal synchronizing pulses within the vertical blanking interval of each program field. The composite signal is then transmitted to the home receiver in the usual manner, where apparatus is additionally included to separate the message signals from the rest of the received signals. The separated message signals may be recorded using a thin window-type cathode-ray tube and an associated electrophotographic printer, while the primary program signals are displayed on the kinescope of the home receiver in the conventional way.

A second embodiment of the system described in U.S. Pat. No. 3,493,674 transmits the auxiliary message information during the picture interval of the television signal rather than during its blanking interval. Apparatus is described by means of which the receiver counts to the particular line in the television frame in which the information is inserted for subsequent recovery and reproduction in hard-copy format. While such an arrangement is generally not compatible with existing television equipment in that it uses those active lines for the auxiliary message as are used for the primary program information, the embodiment discloses the use of a simple switching scheme to control the television studio equipment to select the one of the two types of information which is to be transmitted.

One of the prime concerns in constructing such embodiments is the reliable selection at the receiver of that particular portion of the vertical blanking interval or that active line which contains the auxiliary message desired to be reproduced. It will be readily apparent that if the desired message were missed, the overall information display would not be entirely correct. Whereas this is objectionable as producing an undesired streak in the hard-copy picture, the problem is much worse in those instances where category code signals are additionally transmitted during the television line intervals to identify the location of the message content, and it is the identifying signal which is missed. That is, in the first instance where the desired message—such as, civil defense information—is transmitted in one active line position while a second message—such as, stock market data—is transmitted in an adjacent line, any unreliable line selection might result in the electrophotographic printing or other reproduction of the undesired stock market data in the civil defense printout and, almost as important, would cause part of the civil defense message to be missed. In the second instance, on the other hand, improper selection of the identifying code signal due to incorrect line selection in conditioning the response of the receiver could wrongly lead to the reproduction of the entire stock market listing instead of the civil defense information. This is especially so when those message contents are identified by the same code signal but positioned in adjacent portions of the vertical blanking interval of the television signal or in adjacent active lines.

SUMMARY OF THE INVENTION

As will become clear hereinafter, apparatus according to the invention enables reliable line selection through the cooperative action of digital circuitry counting down from the transmitted horizontal synchronizing pulses available in the receiver, and controlled by a transmitted "flag" signal to accurately synchronize the logic. The "flag" can be unreliable in the sense that its responding circuits dismiss weak "flag" signals and are energized only by the signals extending beyond a predetermined threshold. In this manner, a large percentage of observations may be missed, but false indications have a low probability of occurrence. Such "flag" signals may be transmitted during any one of the 525 lines of a television frame, and have been found particularly suitable for the described control when transmitted in that line interval which comes after the last equalizing pulse following the serrated vertical synchronizing pulse on the "even" interlaced television field.

Such "flag" synchronization has been found more desirable in establishing a stable timing reference than comparable systems which count down from the leading edge of a vertical synchronizing pulse or from a fairly strong burst transmitted on each television field. In particular, those arrangements which operate from the leading edge of the vertical synchronizing pulse can lead to inaccurate line selection due to the approximately 31.5 microsecond difference which exists between alternate television fields and which can lead to gating within different portions of a line in which multiple messages are time shared. Such problem is compounded when tolerance allowances for this leading edge are considered, which have been known to cause a loss of interlace particularly in the presence of noise and other transmission imperfections. On the other hand, transmission of a fairly strong burst on each television field could cause compatibility problems with existing receivers, especially when the signal is of a video tone transmitted during the vertical blanking interval and picked up by receivers having poor retrace blanking. Use of such burst signal also has the disadvantage of its being transmitted during a line interval which could be used for the transmission of auxiliary information of the type envisioned, rather than as a timing reference for line selection control. As will become clear, the "flag" signal transmitted in accordance with the invention is sent at such a point in the "even" television field as to have little future potential for auxiliary message use because the corresponding interval on the transmitted "odd" television field is split by an equalizing pulse.

BRIEF DESCRIPTION OF THE DRAWINGS

These and other advantages of the instant invention will become apparent from a consideration of the following detailed description of preferred embodiments thereof in which.

DETAILED DESCRIPTION OF THE INVENTION

Figure 1:
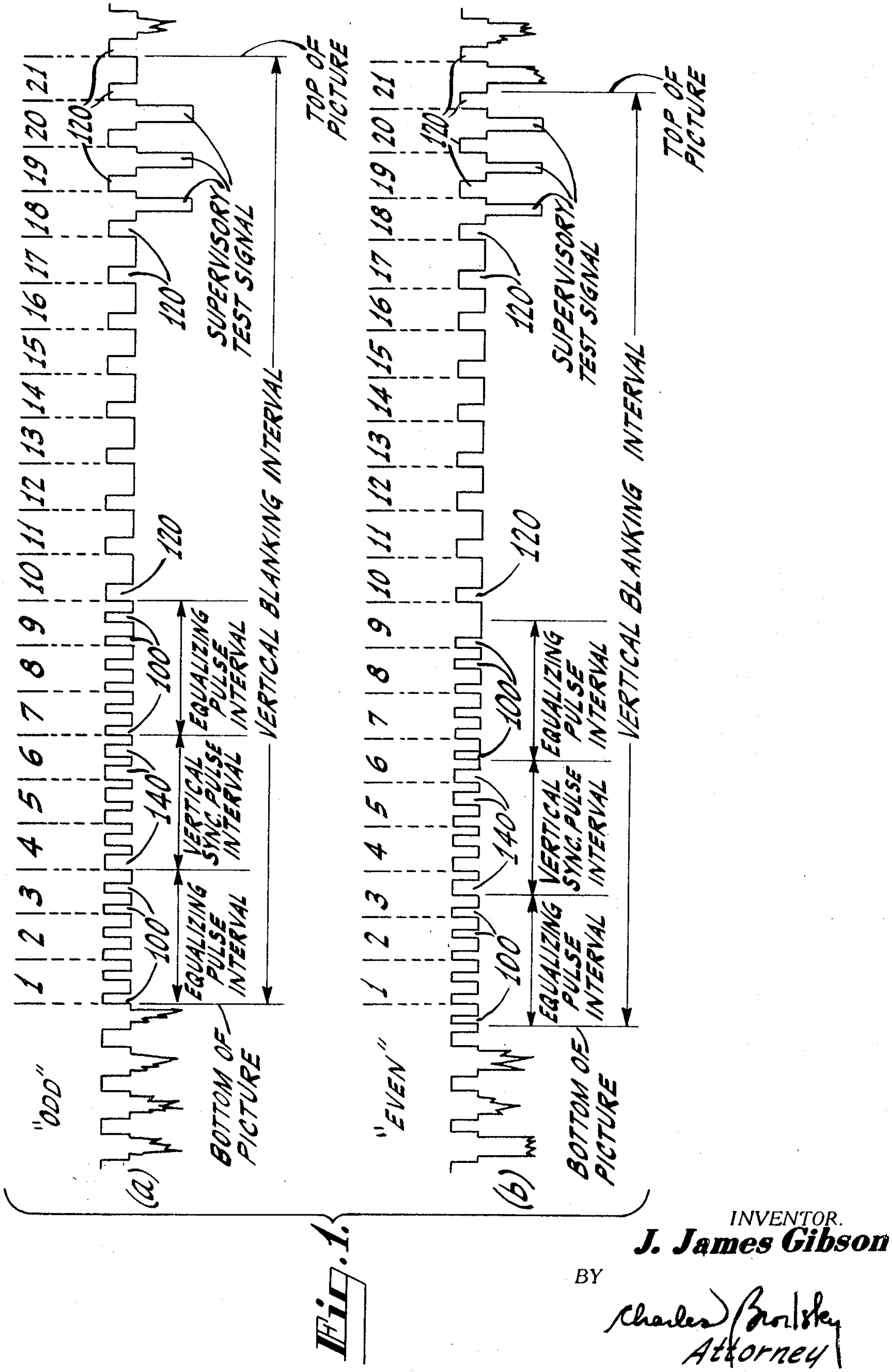
FIG. 1 is a series of curves illustrating the vertical blanking interval for alternate fields of an interlaced television signal.

Referring now to FIG. 1 in more detail, the curves (a) and (b) there shown illustrate respectively the vertical blanking interval for the two alternate fields of the interlaced television signal used in the United States. As is well known, each of these intervals includes equalizing pulses 100, horizontal synchronizing pulses 120, and serrated vertical synchronizing pulses 140. The equalizing pulses 100 function to maintain vertical synchronization of a television receiver even though two interlaced scanning fields are utilized, while the horizontal synchronizing pulses 120 maintain horizontal synchronization of the receiver during the latter portion of each of the vertical blanking intervals. The serrated vertical synchronizing pulses 140 maintain horizontal synchronization of the receiver during the vertical synchronizing pulse.

The composite synchronizing signal depicted in waveforms FIG. 1 (a) and 1 (b) is also used to synchronize the horizontal deflection in the thin window cathode-ray tube of the above-described television message system receiver. When used in such an environment, the composite synchronizing signal additionally includes auxiliary video message signals located, for example, in that space in the vertical blanking interval indicated in waveforms (a) and (b) by the numeral "16." Message identifying category code signals might further be included, in that space denoted "15," for example, as described in U.S. Pat. No. 3,493,674. Such code signals will be seen to be inserted within an earlier time interval than its associated message—so that transmission of a code signal of frequency $f_1$, for example, in horizontal interval "15" may indicate that transmission of stock market information will follow in the succeeding interval "16." Transmission of a code signal of frequency $f_2$ in interval "15" may then indicate that transmission of civil defense information will be forthcoming in interval "16," or within the active line interval, as well, as described in the aforesaid patent.

As is also indicated in the waveforms of FIG. 1, the identification of line intervals in which auxiliary or coding informations may be positioned begin from the leading edge of the first equalizing pulse for the "odd" television field and with the leading edge of the second equalizing pulse 100 for the "even" field. As is well known, the time difference between the leading edges of these equalizing pulses for the two fields is approximately 31.5 microseconds, equal to one-half a horizontal line interval. Such time difference also will be seen to exist between the leading edge of the serrated vertical synchronizing pulse with respect to corresponding horizontal pulses in the alternating "even" and "odd" interlaced fields.

These time differences as noted above might very well cause problems in the recovery of message information in the above-noted systems, particularly in the presence of noise and other transmission imperfections. Thus, where the location of the message information is known to be within the latter portion of a horizontal line interval and a given number of microseconds away from the leading edge of vertical sync, such time difference as exists between the alternate fields could very well lead to recovery of that message information which occupies the beginning portion of that line interval on alternate fields. Besides this occurrence, present receiver designs by and large dictate a one-half horizontal line tolerance in the generation of the leading edge of the vertical synchronizing pulse, so that even where the desired information occupies an entire horizontal line interval, the tolerance can also be such as to lead to selection of informations in preceding or following line interval locations. When this happens, the reproduced output of an electrophotographic printer would generally include a streak of wrong information in place of that wished to be reproduced—for example, stock market data in the reproduction of civil defense information. Where the line selection is not for the message content itself but for a category code signal identifying the type of information which the home-owner wishes to have reproduced, such inaccurate selection could cause the reproduction to be of an entirely incorrect message. Where the coding is of the type where tone bursts of the same frequency occupy different line locations, then a receiver instruction to reproduce news messages identified by a specified code signal in a first line interval could result in the reproduction of a transmitted recipe information identified by that same frequency signal located in an adjacent line interval.

In other arrangements, where the reference timing signal constitutes a fairly strong frequency burst transmitted during each interlaced field, the problem could arise that while no improper selection of message or code would result, that signal could cause compatibility problems with existing receivers when that signal is transmitted during the vertical blanking interval and the receiver has poor retrace blanking. The use of such vertical blanking interval position for such a timing signal further proves unattractive in that it occupies a space which more attractively could be used for the transmission of additional message contents. This will be readily apparent once it is realized that limited spacings exist within the vertical blanking interval to begin with, and present usage generally allots at least two spaces therein for the transmission of supervisory test signals useful to television networks and broadcasting stations to measure transmission performance.

As will be seen from the description immediately following, the apparatus of the present invention employs a signal for generating a timing reference, but one which is characterized by being fairly weak and transmitted only on every other interlaced field. By being a relatively weak signal, no compatibility problem will be seen to exist, while the transmission on one field only permits selection of that space for its location to be within one portion of the vertical blanking interval which has little future potential in auxiliary message transmission. Such interval illustratively might be the first line after the last equalizing pulse following vertical sync on the "even" television field, as such interval is split by the last equalizing pulse in the "odd" field, thereby making the interval generally unattractive for use in the message system of the type described in U.S. Pat. NO. 3,493,674. This "flag" signal can be weak and, therefore, unreliable in the sense that the receiver can miss the signal in a very large percentage of observations but not so weak that other signals are mistaken for its presence to yield false alarm indications.

Figure 3:
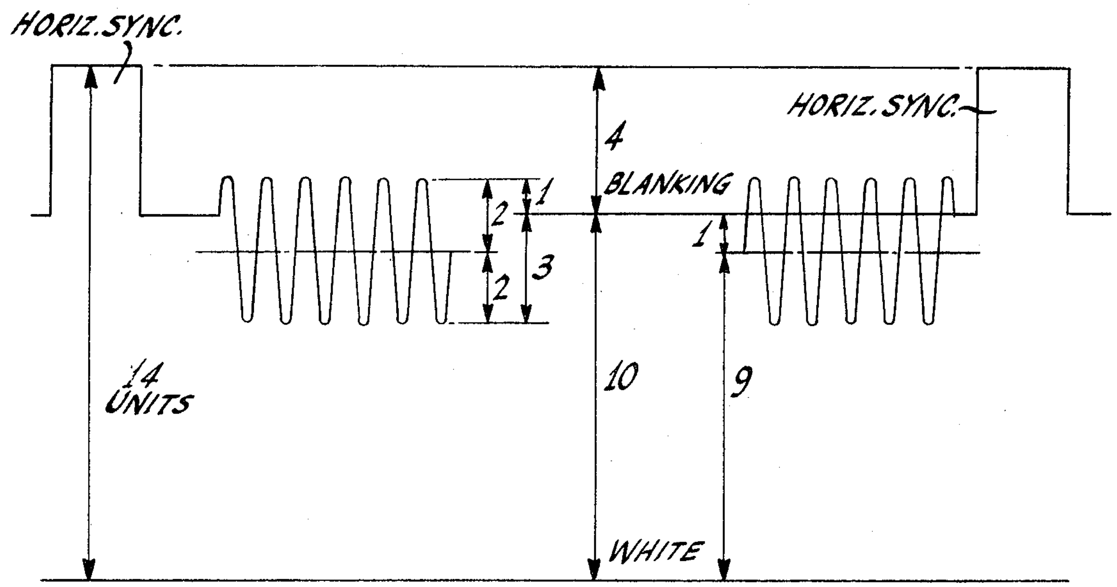
FIG. 3 is an illustration of a type of "flag" signal which may be used with the invention.

Such a "flag" signal might appear as shown in FIG. 3 as a full line burst (i.e., 50 microseconds long) of a 4 MHz. video tone. If the amplitude of white-to-blanking level is assumed to be ten units as shown, and the amplitude of the horizontal synchronizing pulse four units, this tone burst could have an amplitude of two units superimposed on an average direct level one unit below blanking, and still not interfere with receivers having inadequate retrace blanking. More specifically, typical receiver operations would attenuate such a 4 MHz. tone by about 12 db., to bring the burst amplitude down to one-half unit and limit its going whiter than black to 1½ units. Since receiver kinescopes generally have a gamma of 2, the burst would then be no more than 6.25 percent white, thus requiring only 6.25 percent retrace blanking of the receiver. While other "flag" signals could also be used, the 4 MHz. tone would almost certainly be compatible with present day receivers due to this small retrace blanking requirement and due to the fact that a tone of 4 MHz. is very much attenuated in typical television receiver design.

Figure 2:
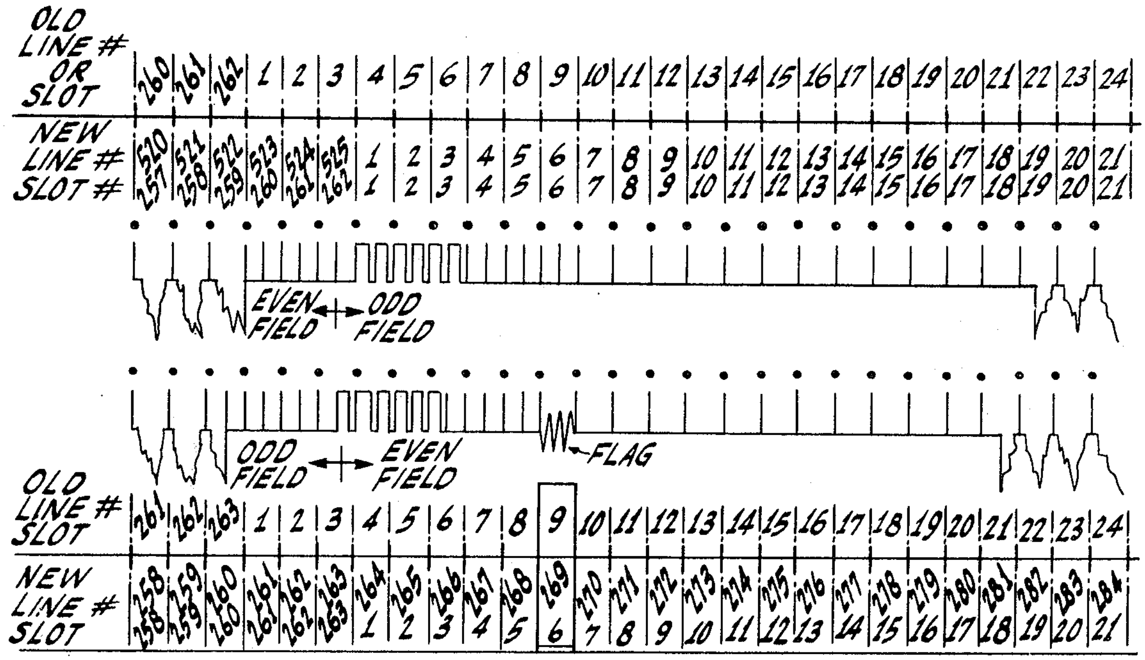
FIG. 2 is a series of simplified curves of the interlaced signal useful in describing the invention.
Figure 4:
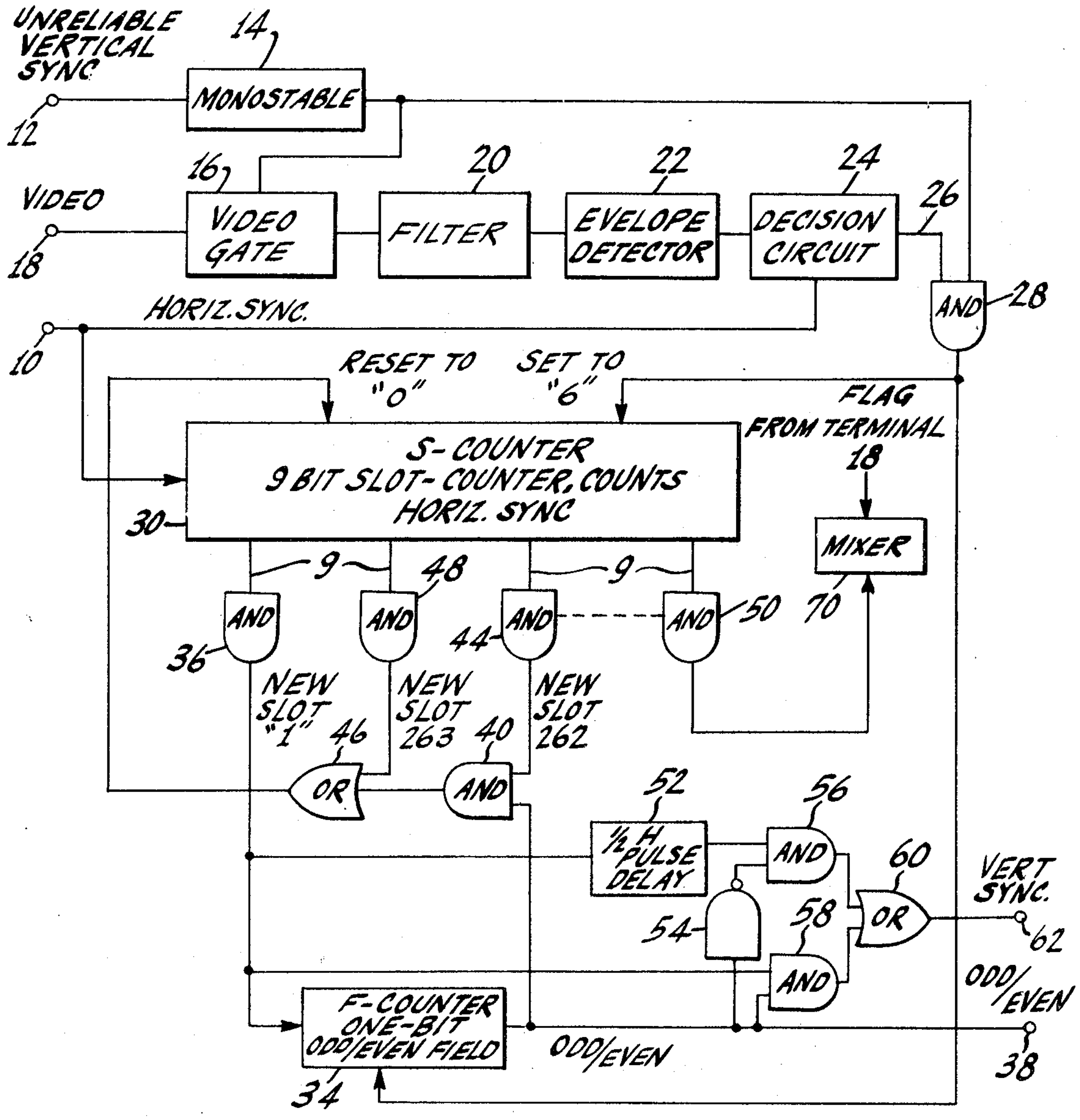
FIG. 4 is a block diagram showing one arrangement of apparatus for enabling reliable line selection in a television message system, of the type described in U.S. Pat. No. 3,493,674, for example.

Before considering the block diagram of FIG. 4 which represents one embodiment of the apparatus of the invention, it would be advantageous to first define the line and slot numbering system by which message locations in the transmitted television signal can be identified. Thus, it will be noted from the waveform of FIG. 1 that "odd" fields can be identified by the fact that the leading edge of the vertical synchronizing pulse coincides with the leading edge of a horizontal synchronizing pulse, while "even" fields can be identified by the fact that the leading edge of the vertical synchronizing pulse comes between two successive horizontal pulses. The first line of an "odd" television field can then be defined as the first line following the coincidence of the leading edges of its vertical and horizontal synchronizing pulses. The first line of the "even field, on the other hand, comes 263 horizontal lines later, i.e., the leading edge of vertical sync comes 262 ½ lines later in the middle of television line 263. If the first slot into which an auxiliary message is to be inserted is defined as starting with the first horizontal synchronizing pulse which coincides with the serrated vertical synchronizing pulse, then the line numbers and slot numbers are the same for the "odd" interlaced field while the line number for the "even" field equals the slot number plus 263. Thus, slot 1 corresponds to line 1 for an "odd" field, and corresponds to line 264 for the "even" field. Slot 2 similarly corresponds to line 2 of the television frame for the "odd" field, and corresponds to line 265 for the "even" field. With this convention, the "odd" interlaced field contains 263 slot starts while the "even" field contains only 262 slot starts. Such identifications can be seen from the simplified waveforms of FIG. 2, where the identifying label "OLD" defines the numbering system employed in the aforesaid U.S. Pat. while the label "NEW" defines the numbering system used herein. The utilization of such definition will be seen from the following description of the apparatus of the invention, which includes digital logic circuitry operative to insert the 4 MHz. "flag" signal into slot 6 of the "even" interlaced field, corresponding to line 269 of the television frame.

Referring now to the block diagram of FIG. 4, a pair of input terminals 10 and 12 are shown, to which are applied horizontal and vertical scanning rate pulses, respectively, coupled, for example, from the horizontal and vertical oscillators present in the television receiver. The vertical synchronizing pulses supplied at terminal 12 have the jitter and tolerance characteristics described above, and are coupled to a monostable multivibrator 14 to generate a gate in response to the leading edge of the synchronizing pulse as would cover at least slot 6 of both interlaced fields. The pulse developed by multivibrator 14 is then coupled to a gating circuit 16 to which the recovered video signal is also supplied, by means of input terminal 18. The "flag" signal transmitted during slot 6 of the "even" field passes through gate 16 and is coupled to a high pass filter followed by a peak limiting clipper for the case where the "flag" consists of a video tone burst. An envelope detector 22 and decision threshold circuit 24 follow this filter 20 to provide a detected envelope which is sampled—preferably at the end of the 269th line interval—to yield an output pulse for coupling to input 26 of an AND-circuit 28 if the "flag" signal magnitude exceeds the predetermined threshold. In one arrangement for the invention, the threshold level can be chosen of a sufficiently high magnitude to reduce the possibility of a false alarm, while in other embodiments, the false alarm rate can be reduced by requiring successively detected "flag" signals to generate the output for AND-circuit 28. To further reduce the possibility of false alarms, the pulse developed by multivibrator 14 can also be applied to AND-circuit 28 to insure that the output pulse developed in response to the "flag" occurs substantially only during slot 6 of the "even" field. This "flag" signal is used to synchronize the remaining logic circuitry of FIG. 4 to provide a stable timing signal from which the receiver apparatus counts to select that line interval in a television frame in which the auxiliary message or code signal is transmitted.

Such digital logic includes a nine-bit slot or S counter 30 driven by the horizontal synchronizing pulses coupled to its input from terminal 10. With the line and slot numbering sequence defined above, counter 30 may include nine serially coupled flip-flop stages, and is thus able to count 512 input pulses. However, operating in conjunction with the counter 30 are three nine-way AND circuits, each of which senses the state at the output terminals of the flip-flop stages to cooperatively reset counter 30 after 262 pulse counts for the "even" interlaced field and after 263 pulse counts for the "odd" field.

In particular, a one-bit, television field or F counter 34 is shown responsive to drive pulses applied to one of its illustrated input terminals from the output of the first nine-way AND-circuit 36. Such AND-circuit 36 is connected to the various outputs of the nine flip-flops of counter 30 to produce a pulse only when the nine-bit unit 30 counts the first applied horizontal synchronizing pulse. The output pulse from AND 36 is applied to the one-bit unit 34 in a manner to set that unit to its "1" condition, which indication is applied to one leg of a two-way AND CIRCUIT 40. Also coupled to AND-circuit 40 is the output from the second nine-way AND-circuit 44.

Such second nine-way circuit is connected to the flip-flop stages of counter 30 to sense the count reaching 262 and to provide an output pulse as a response to the second input of AND 40. With counter 34 being in its "1" condition at this time, that output pulse is applied by AND-circuit 40 to one input of a two-way OR-circuit 46, the output of which is coupled to appropriate RESET terminals of the flip-flop counter stages. The second input of OR-circuit 46 is in turn coupled to the third nine-way AND-circuit 48, which is arranged to sense unit 30 counting to 263 and to provide an output pulse in response thereto. Thus, in response to the recovery of an "even" interlaced field signal, a pulse will be developed at the output of OR-circuit 46 after 262 horizontal synchronizing pulses have been counted by the unit 30, at which time counter 30 resets to its zero value, before AND-circuit 48 is energized.

In response to the application of the next occurring horizontal synchronizing pulse—of the "odd" interlaced field--i.e., the first pulse,—AND-circuit 36 develops an output to switch counter 34 to its opposite "0" state to provide an inhibit signal for AND-circuit 40. Upon the count then reaching 262, it will be seen that no signal is translated through circuit 40, but a pulse signal will be developed by AND-circuit 48 upon the count reaching 263. The signal developed by AND-circuit 48 thus provides the pulse coupled through OR-circuit 46 to reset the nine-bit counter 30. In this manner, the nine stage unit 30 counts 262 horizontal pulses for the "even" field and 263 for the "odd" interlaced field.

The condition of the one-bit counter 34 at any instant of time can serve as an odd/even television field indicator at terminal 38, useful in the transmission of single or multiple frame messages over a clear television channel (such as is provided by cable antenna television operators). To insure that counter 30 does not count 262 pulses on an "odd" field and 263 on an "even" field instead of the desired reverse counts, the "flag" signal developed by AND-circuit 28 is also coupled to counter 34. In particular, since this "flag" signal occurs only on "even" television fields, it can be coupled to the counter 34 in such manner as to switch that counter to its "even" field condition (the "1" state as indicated above) if the counter is not already in that state. Thus, the "flag" signal serves to check the counter 34 and to correct it if it is in the wrong state, which may occur after a nonsynchronous camera switch or in the presence of noise in the signal transmission.

At the same time that the "flag" signal is coupled to the one-bit counter 34, the "flag" signal is coupled to the various SET terminal inputs of the nine-bit counter 30 to set it to the count corresponding to its slot position in the interlaced frame. Thus, with the system assumed, the "flag" signal sets the counter to count "6" if the counter 30 is not already at that particular value. Thus, the counter 30 is synchronized by the "flag" signal, and the count begins anew with respect to this setting. In theory, only one "flag" signal is needed to set the system once the system is turned on, so that the rate of transmission of "flag" signals could be very low. However, such "flag" signals are transmitted during each "even" interlaced field of the disclosed arrangement for use in those instances where nonsynchronous camera switching can occur and upset the otherwise described operation.

The arrangement of FIG. 4 additionally includes a fourth nine-input AND-circuit 50 coupled to the individual flip-flop stages of the counter 30 in accordance with the location of the desired auxiliary message in the television frame. To be more specific, if it is predetermined that desired civil defense information is transmitted in slot 151 of the television frame, then AND-circuit 50 is connected to provide an output pulse in substantial time synchronism with the interval between the 150 and 151st horizontal synchronizing rate pulse. This output signal is then applied to a mixing circuit 70 to which the video signal including the auxiliary message is also coupled, in a manner to derive the information contained therein by appropriate gating action during the 150th line interval. Similarly, if the information desired is included in the vertical blanking interval, the AND-circuit 50 can be coupled to counter 30 to develop the output pulse at the selected time. Since the "flag" signal continually synchronizes the counter 30, the pulse developed by AND-circuit 50 will be stabilized so that line selection will be accomplished with increased accuracy.

The arrangement of FIG. 4 further includes a pulse delay network 52, an inverter circuit 54, two AND-circuits 56 and 58 and an OR-circuit 60. These units cooperate, as will be seen, to provide at terminal 62 a vertical synchronizing rate pulse of increased stability. Thus, the pulse developed by AND-circuit 36 for the "even" interlaced field switches counter 34 to its "1" state to enable its coupling through AND-circuit 58 and the cascaded OR-circuit 60. Such a signal occurs in slot 1 on "even" fields. Counter 30 resets to zero 262 counts later and thereby switches counter 34 to its "0" state to inhibit AND-circuit 58. Such switching, in turn, enables AND-circuit 56 by the action of inverter 54, and the resulting pulse developed by AND-circuit 36 during slot 1 of the "odd field" is coupled through the delay network 52, AND-circuit 56 and OR-circuit 60 to output terminal 62. It will be seen that by selecting a one-half line delay for the unit 52, the pulses developed at terminal 262 are spaced 262½ horizontal lines apart, and are reliably synchronized with the line scanning rate pulses.

While there has been described what is considered to be a preferred embodiment of the present invention, it will be appreciated that other modifications are present without departing from the scope of the teachings herein. Thus, digital code signals could be used for the "flag" instead of the tone burst described, requiring modifications which will be readily apparent in the recovery of the "flag" from the incoming video signal supplied at terminal 18. Similarly, additional nine-input AND circuits or other logic circuits can be used to select all particular line intervals in which the message is known to be located; in this manner, one such circuit can be used to sense that line of the television frame in which the identifying code signal is incorporated while a second or further such circuit can be used to select the forthcoming program line, field, frame or frames in which the message is thereafter transmitted. The first circuit, in such instance, controls the recovery of information in the line interval selected by the second and further circuits, only if the identifying code signal present in the first selected slot corresponds to that desired.

What is claimed is:

1. In a television system of the type wherein message information is multiplexed between predetermined line scanning rate pulses of a broadcast signal to provide an auxiliary transmission service which is in addition to that provided the picture tube of the receiver employed in such system, wherein said broadcast signal comprises at least two alternating interlaced fields containing a field scanning rate pulse in addition to said line scanning rate pulses, and wherein the timing of the leading edge of said field scanning rate pulse differs with respect to the timing of said line scanning rate pulses on alternate ones of said two interlaced fields, apparatus for permitting the reliable selection of desired message information from said broadcast signal for the subsequent recovery and reproduction thereof, comprising;

means supplying timing pulses at a frequency equal to that of said line scanning rate pulses and substantially in time synchronism therewith;

counter means counting that number of pulses supplied by said last-mentioned means which corresponds in number to the line scanning rate pulses present in each of said alternate interlaced fields before resetting to zero upon reaching said count;

digital logic means coupled to said counter means for providing an output pulse in response to said counter means counting to that number which corresponds to the position between said predetermined line scanning rate pulses in which said desired message information is multiplexed;

means supplying said multiplexed broadcast signal including said desired message information and said scanning rate pulses;

means responsive to the output pulse provided by said digital logic means and to said supplied broadcast signal for mixing said signals together for recovering the desired message thereof to the exclusion of said multiplexed scanning rate pulses; and means additionally responsive to said supplied timing pulses for additionally transmitting a control signal only on one of said two interlaced fields of said broadcast signal to synchronize said counter means and thus, stabilize the timing of the leading edge of said provided output pulse and the time of occurrence of said recovered signal;

said control signal being transmitted during said one interlaced field at a substantially low amplitude level with respect to the blanking level of said picture tube so as to limit detrimental interference with the retrace of said tube.

2. The apparatus of claim 1 wherein said broadcast signal comprises an "even" interlaced television field signal and an "odd" interlaced television field signal, each of which contain equalizing pulses in addition to said scanning rate pulses, and wherein said control signal is transmitted during said "even" interlaced field signal between those line scanning rate pulses which come after the last equalizing pulse following the field scanning rate pulse of said interlaced signal.

3. The apparatus of claim 1 wherein there is additionally included second counter means coupled to said digital logic means to provide an output pulse, the state of which is indicative of whether said means supplying said multiplexed broadcast signal is then supplying the "odd" interlaced field signal or the "even" interlaced field signal of said television broadcast signal.

4. The apparatus of claim 1 wherein the timing of the leading edge of said field scanning rate pulse is subject to tolerance variations and wherein said transmitted control signal is coupled to said counter means to insure its setting at a predetermined count to stabilize the leading edge of the output pulse developed by said digital logic means as being with respect to said supply timing pulses rather than with respect to said varying field scanning rate pulses.

* * * * *